United States Patent
Steiner et al.

(10) Patent No.: US 10,132,626 B2
(45) Date of Patent: Nov. 20, 2018

(54) ADAPTIVE DISTANCE ESTIMATION

(71) Applicant: Infineon Technologies AG, Neubiberg (DE)

(72) Inventors: Christoph Steiner, St. Margarethen (AT); Johannes Gruenwald, Tarrenz (AT); Michael Mark, Graz (AT)

(73) Assignee: Infineon Technologies AG, Neubiberg (DE)

( * ) Notice: Subject to any disclaimer, the term of this patent is extended or adjusted under 35 U.S.C. 154(b) by 411 days.

(21) Appl. No.: 14/030,893

(22) Filed: Sep. 18, 2013

(65) Prior Publication Data
US 2015/0077542 A1  Mar. 19, 2015

(51) Int. Cl.

| | |
|---|---|
| *G01C 3/00* | (2006.01) |
| *G01S 7/491* | (2006.01) |
| *G01S 17/36* | (2006.01) |
| *G01S 17/93* | (2006.01) |
| *H04N 5/225* | (2006.01) |
| *G01S 17/66* | (2006.01) |
| *H04N 5/14* | (2006.01) |

(52) U.S. Cl.
CPC .............. *G01C 3/00* (2013.01); *G01S 7/4914* (2013.01); *G01S 7/4915* (2013.01); *G01S 17/36* (2013.01); *G01S 17/936* (2013.01); *H04N 5/2256* (2013.01); *G01S 17/66* (2013.01); *H04N 5/144* (2013.01)

(58) Field of Classification Search
CPC ...... H04N 5/1144; H04N 5/2256; G01C 3/00; G01S 17/36; G01S 17/66; G01S 17/936; G01S 17/4914; G01S 17/4915
See application file for complete search history.

(56) References Cited

U.S. PATENT DOCUMENTS

| | | | |
|---|---|---|---|
| 2005/0111697 A1* | 5/2005 | Yamamoto | G06T 7/74 382/103 |
| 2005/0195383 A1* | 9/2005 | Breed | B60N 2/002 356/4.01 |
| 2007/0182949 A1* | 8/2007 | Niclass | G01C 3/08 356/3 |
| 2007/0247138 A1* | 10/2007 | Miller | A61B 5/0031 324/76.51 |
| 2008/0029690 A1* | 2/2008 | Hashimoto | G01C 3/085 250/214.1 |

(Continued)

FOREIGN PATENT DOCUMENTS

| | | |
|---|---|---|
| DE | 102011078338 | 1/2013 |
| WO | WO 2014/177750 | 11/2014 |

OTHER PUBLICATIONS

Lange, "3D Time-of-Flight Distance Measurement with Custom Solid-State Image Sensors in CMOS/CCD-Technology", Dissertation, (2000), 223 pages.

*Primary Examiner* — Marnie A Matt
(74) *Attorney, Agent, or Firm* — Harrity & Harrity, LLP (57) ABSTRACT

Representative implementations of devices and techniques provide adaptive distance estimation for imaging devices and systems. Distance estimation may be based on phase delays in reflected light. Reference phases used to determine phase delay values may be changed for subsequent frame events. Multiple frame events may be selected for some distance calculations based on whether object movement is detected within a predetermined area.

24 Claims, 6 Drawing Sheets

(56) References Cited

U.S. PATENT DOCUMENTS

| | | | |
|---|---|---|---|
| 2008/0068251 A1* | 3/2008 | Meinecke | G01S 13/34 342/112 |
| 2008/0231832 A1* | 9/2008 | Sawachi | G01S 7/493 356/5.1 |
| 2008/0316321 A1* | 12/2008 | Steinberg | G06T 7/20 348/208.1 |
| 2010/0289692 A1* | 11/2010 | Winkler | G01S 7/4008 342/70 |
| 2012/0013528 A1* | 1/2012 | Kim | G01S 17/023 345/156 |
| 2013/0002861 A1* | 1/2013 | Mitsugi | G01C 3/00 348/135 |
| 2013/0057713 A1* | 3/2013 | Khawand | H04N 5/232 348/208.1 |
| 2013/0176445 A1* | 7/2013 | Streeter | G01S 17/36 348/208.1 |
| 2013/0211672 A1* | 8/2013 | Roehder | G06F 17/00 701/36 |
| 2013/0275873 A1* | 10/2013 | Shaw | G01S 3/8006 715/716 |
| 2014/0350836 A1* | 11/2014 | Stettner | G01S 17/023 701/301 |
| 2015/0202939 A1* | 7/2015 | Stettner | B60R 21/0134 701/37 |
| 2016/0086318 A1* | 3/2016 | Hannuksela | G06T 5/002 348/43 |

* cited by examiner

ADAPTIVE DISTANCE ESTIMATION

BACKGROUND

Imaging systems based on light waves are becoming more widely used for object detection as semiconductor processes have become faster to support such systems. Some imaging systems are capable of providing dozens of images per second, making such systems useful for object detection and/or tracking as well. Due to their potentially small form factor and potentially high signal fidelity, some imaging systems are well suited for application in many types of vehicles (cars, busses, trains, etc.). Additionally, some imaging systems are well suited for gesture control, or the like, in many types of consumer devices (e.g., television, computers, tablets, smartphones, etc.). While the resolution of such imaging systems may vary, applications using these systems are able to take advantage of the speed of their operation.

A moving vehicle such as an automobile, for example, may use an imaging system to detect an object (a pedestrian, for example) in the path of the vehicle, to avoid hitting the object. For example, an imaging system may be employed on the front, rear, and/or the side(s) of the vehicle to detect objects in the forward or reverse paths of the vehicle, to the side of the vehicle, or in the blind spots of the vehicle.

Time-of-flight cameras, for example, may use imaging devices to measure the distance of an object from the camera. Imaging devices using multiple pixels may also be used, where light signals associated with individual pixels may provide distance measurements for discrete points on the object, forming a three-dimensional "distance image." This can be made possible with light signals reflected off of the discrete points, for example.

Whether deployed in a vehicle application, a consumer device application, or other type of application, it is desirable to increase the efficiency of imaging systems while maintaining or improving the performance. For example, the usefulness of an imaging system as applied to a vehicle, mobile device, or the like, is diminished when the accuracy or clarity of the system is low, but the power demand is great.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

This disclosure is related to imaging systems (imaging systems using emitted electromagnetic (EM) radiation, for example) that are arranged to detect, image, recognize, and/or track objects and/or gestures in a predetermined area relative to the imaging systems. For example, an imaging system associated with a vehicle may be used to detect an object in the path of the vehicle, or in an area near the vehicle. Additionally, the imaging system may track the object or provide an image (such as a three-dimensional image, for example) of the object. In other examples, an imaging system may be used to detect and recognize gestures of an object or a human hand, for instance, in an area near a computing device. The imaging system may recognize when the object or hand is making a gesture, and track the hand-gesture combination as a replacement for a mouse or other input to the computing device.

In various implementations, the imaging system uses time-of-flight principles, such as distance calculations of reflected EM emissions (i.e., electro-magnetic radiation), to detect, image, recognize, and/or track objects, for example. Time-of-flight distance calculations may be based on receiving reflections of emitted EM ("light") radiation, as the light radiation is reflected off objects in a predetermined area. For example, in one case, the distance calculations may be based on the speed of light and the travel time of the reflected light radiation.

Representative implementations of devices and techniques provide adaptive distance estimation for imaging devices and systems. In various implementations, distance estimation calculations may be based on phase delays in the reflected light radiation. In one non-limiting example, a phase delay value may be defined as the sampled output of a pixel, where the output of a pixel is the correlation between the incoming light (reflected by the scene) and the reference signal (generated on chip) with a fixed reference phase shift with respect to the emitted light signal. For example, phase delay values captured in the reflected light during a frame event (i.e., image capture at a point in time) can be used to determine the distance of an object from an imaging device, where the phase shift from the incident light to the captured reflected light indicates a distance traveled by the light.

In some implementations, one or more reference phases may be used to index the corresponding one or more phase shifts in the reflected light. The reference phases used to determine the phase delay values may be changed (e.g., alternated, rotated, etc.) for subsequent frame events. For example, consecutive frame events (i.e., image captures) may use different sets of one or more reference phases to determine the phase delays in the reflected light.

In an implementation, phase information from multiple frame events may be selected for some distance calculations, rather than using a single image capture. For example, a present frame event may be jointly processed with one or more past frame events to calculate the distance of an object from the imaging system. In an additional implementation, a quantity of past frame events may be selected based on whether object movement is detected within a predetermined area (e.g., the imaging area). In one implementation, the quantity of frame events selected is based on the relative speed of the object movement.

Various implementations and arrangements for imaging systems, devices, and techniques are discussed in this disclosure. Techniques and devices are discussed with reference to example light-based imaging systems and devices illustrated in the figures. However, this is not intended to be limiting, and is for ease of discussion and illustrative convenience. The techniques and devices discussed may be applied to any of various imaging device designs, structures, and the like (e.g., radiation based, sonic emission based, particle emission based, etc.) and remain within the scope of the disclosure.

Implementations are explained in more detail below using a plurality of examples. Although various implementations and examples are discussed here and below, further implementations and examples may be possible by combining the features and elements of individual implementations and examples.

Example Imaging System Environment

Figure 1:
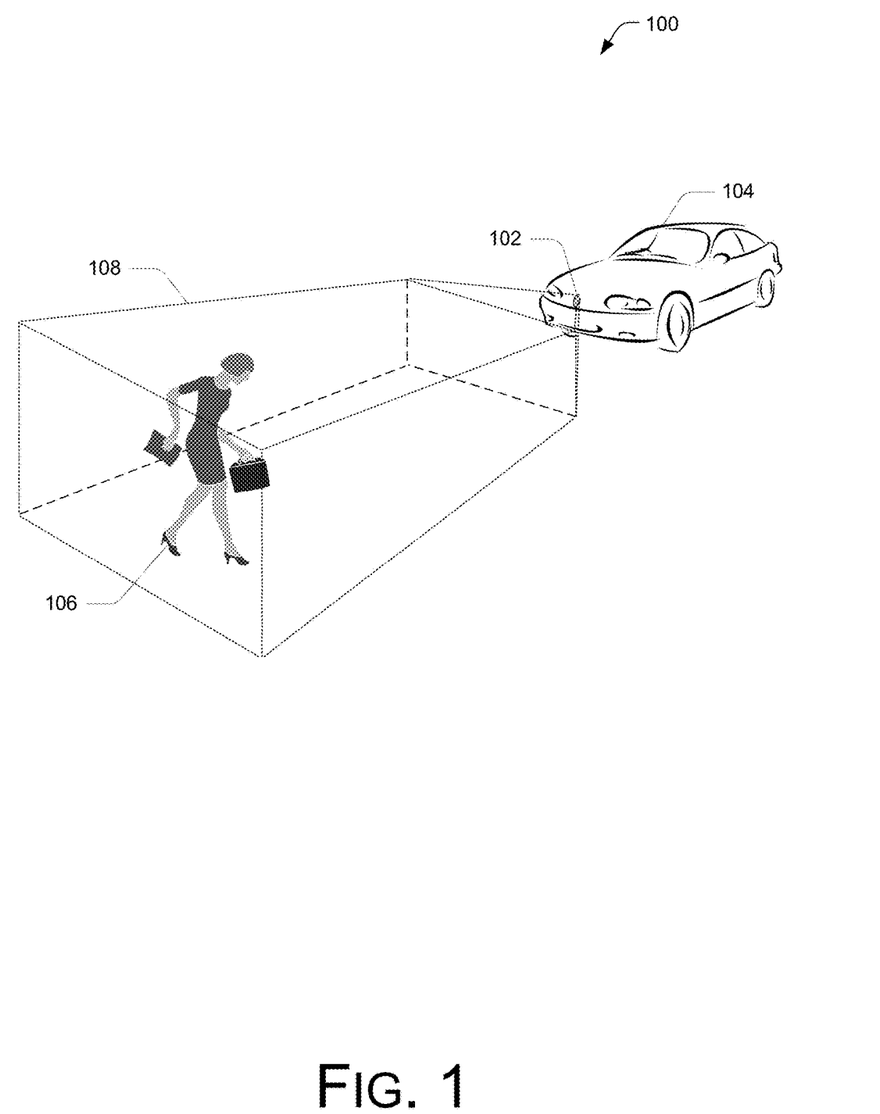
FIG. 1 is an illustration of an example application environment in which the described devices and techniques may be employed, according to an implementation.

FIG. 1 is an illustration of an example application environment 100 in which the described devices and techniques may be employed, according to an implementation. As shown in the illustration, an imaging system 102 may be applied with a vehicle 104 (e.g., automobile, bus, train, aircraft, etc.), for example. In various other implementations, the imaging system 102 may be applied with other systems, devices, and the like (e.g., robotics, automation, surveillance systems, accessibility devices, safety systems, and so forth).

In further implementations, the imaging system 102 may be applied with mobile devices or other computing devices such as laptop or notebook computers, hand-held computing devices, tablet computing devices, netbook computing devices, personal digital assistant (PDA) devices, reader devices, smartphones, mobile telephones, media players, wearable computing devices, stationary computers, personal or desktop computers, televisions, set-top boxes, gaming consoles, audio/video systems, appliances, and the like.

The scope of the disclosure is not intended to be limited to the examples listed. For convenience, reference within this disclosure to a vehicle 104 also refers to all applications employing an imaging system 102 as mentioned above, and otherwise.

In various implementations, the imaging system 102 may be integrated with the vehicle 104, or may have some components separate or remote from the vehicle 104. For example, some processing for the imaging system 102 may be located remotely (e.g., cloud, network, etc.). In another example, some outputs from the imaging system may be transmitted, displayed, or presented on a remote device or at a remote location.

The imaging system 102 may be used to detect an object 106, such as a pedestrian, for example, in a preselected area 108. In various implementations, the imaging system 102 may be arranged to detect, recognize, and/or track the movement of the object 106. In one implementation, the imaging device is arranged to output an image (e.g., a two-dimensional or three-dimensional image) of the object 106. In an example implementation, an output of the imaging system 102 may be presented or displayed on a display device, for example (e.g., a mobile computing device, a smartphone, a vehicle information system, etc.).

An example object 106 may include any item that an imaging system 102 may be arranged to detect, recognize, track, and/or the like. Such items may include a person or an animal, for example. Other examples of an object 106 may include an obstruction, a target component, another vehicle, and so forth. In various implementations, the imaging system 102 may also be arranged to detect, recognize, and/or track a gesture or configuration of the object 106. A gesture or configuration may include any movement or position of the object 106 that is expressive of an idea. For example, a gesture or configuration may include positioning an object 106 in an orientation and/or a movement of the object 106 in a pattern (e.g., in an elliptical motion, in a substantially linear motion, etc.). In one example, the imaging system 102 may be used to detect movement (e.g., a gesture) of a human hand, for example, as a replacement for a mouse or other input device for a computing device, mobile device, or the like.

The imaging system 102 may be arranged to detect, recognize, and/or track an object 106 that is within a preselected area 108 relative to the imaging system 102. A preselected area 108 may be chosen to encompass an area that objects 106 may be within, for example. In one case, the preselected area 108 may encompass an area that represents an immediate or distant forward or reverse path for the vehicle 104. This area 108 may also be to the front, side, or around the imaging system 102, for example.

The illustration of FIG. 1 shows a preselected area 108 as a polygonal-like area in front of the vehicle 104. This is for illustration and discussion purposes, and is not intended to be limiting. A preselected area 108 may be any shape or size, may be located in front, back, side(s), top, and/or bottom of the vehicle 104, and may be chosen such that it will generally encompass desired objects when they are present, but may not encompass undesired objects (e.g., other items that are not intended to be detected, recognized, tracked, or the like). In various implementations, the preselected area 108 may comprise various shapes and sizes. In some implementations, the shape and size of the preselected area 108 is dependent on the current application of the imaging device 102.

As discussed above, the techniques, components, and devices described herein with respect to an imaging system 102 are not limited to the illustration in FIG. 1, and may be applied to other imaging system and device designs and/or applications without departing from the scope of the disclosure. In some cases, additional or alternative components may be used to implement the techniques described herein. It is to be understood that an imaging system 102 may be implemented as stand-alone system or device, or as part of another system (e.g., integrated with other components, systems, etc.).

Example Imaging System

Figure 2:
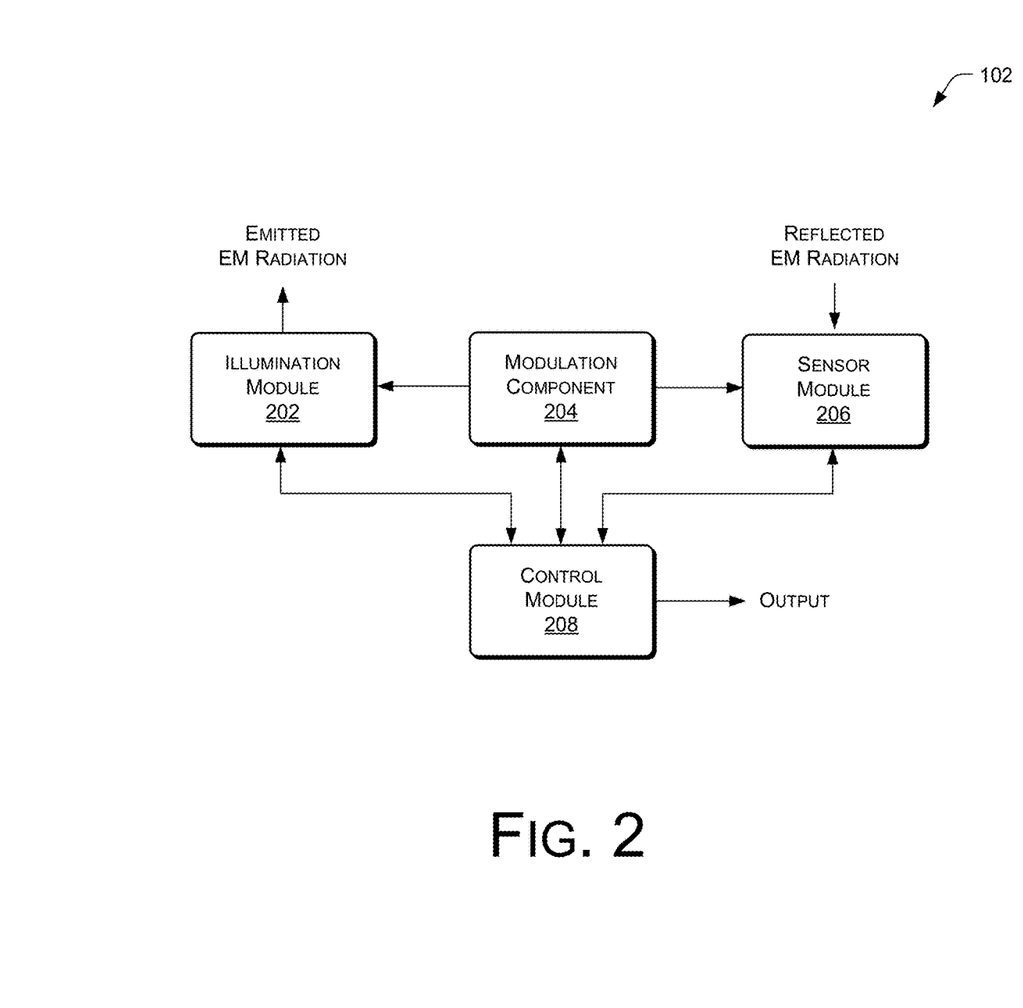
FIG. 2 is a block diagram of example imaging system components, according to an implementation.

FIG. 2 is a block diagram showing example components of an imaging system 102, according to an implementation. As shown in FIG. 2, an imaging system 102 may include an illumination module 202, a modulation component 204, a sensor module 206, and a control module 208. In various implementations, an imaging system 102 may include fewer, additional, or alternate components, and remain within the scope of the disclosure. One or more components of an imaging system 102 may be collocated, combined, or otherwise integrated with another component of the imaging system 102. For example, in one implementation, the imaging system 102 may comprise an imaging device or apparatus. Further, one or more components of the imaging system 102 may be remotely located from the other(s) of the components.

In an implementation, the illumination module 202 is arranged to emit electromagnetic (EM) radiation (e.g., light radiation) to illuminate the preselected area 108. For example, the illumination module 202 may be arranged to illuminate one or more objects 106 that may be present in the area 108, to detect the objects, or to detect movement of the objects 106. In various implementations, the illumination module 202 includes an illumination source such as a light emitter, for example. In one implementation, the illumination source comprises a light-emitting diode (LED). In another implementation, the illumination source comprises a laser emitter. In one implementation, the illumination module 202 illuminates the entire environment (e.g., the preselected area 108) with each light pulse emitted. In an alternate implementation, the illumination module 202 illuminates the environment in stages or scans.

In various implementations, different forms of EM radiation may be emitted from the illumination module 202. In some implementations, infrared light, or the like, is emitted. For example, the light radiation may comprise one or more modulated light pulses. The illumination module 202 may be switched on for a short interval, allowing the emitted light pulse(s) to illuminate the area 108, including any objects 106 within the area 108. Infrared light, for example, provides illumination to the area 108 that is not visible to the human eye, and so is not distracting. In other implementations, other types or frequencies of EM radiation may be emitted that provide visual feedback or the like. As mentioned above, in alternate implementations, other energy forms (e.g., radiation based, sonic emission based, particle emission based, etc.) may be emitted by the illumination module 202.

Figure 3:
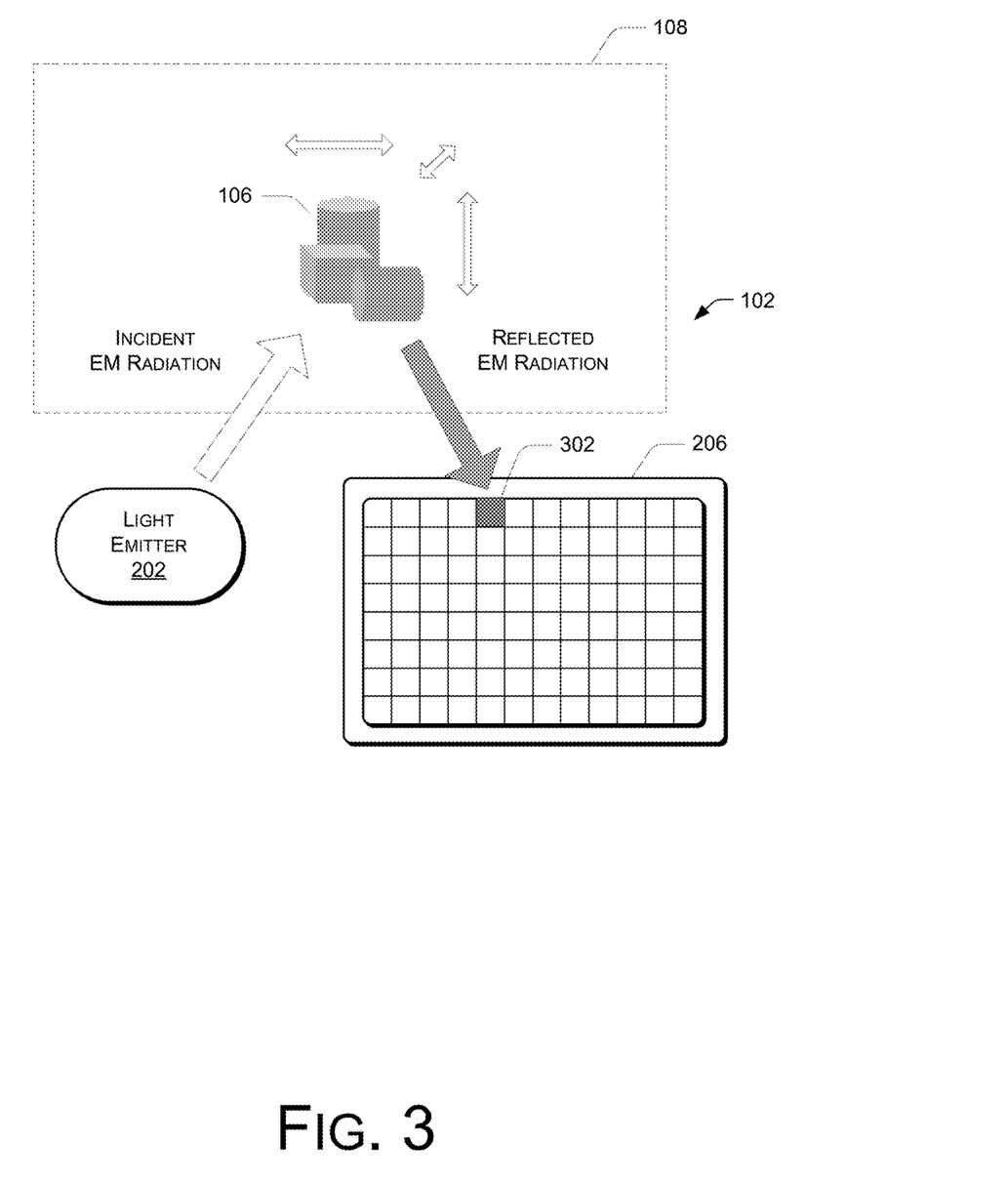
FIG. 3 is a block diagram showing some detail of components of an example imaging system, including a sensor module comprising a plurality of pixels, according to an implementation.

If included in an implementation, the modulation component 204 may be arranged to modulate the EM radiation emitted from the illumination module 202 and/or to modulate one or more components (e.g., photosensitive pixels 302) of the sensor module 206. In various implementations, the modulation component 204 may be arranged to correlate the modulation of the EM radiation with the modulation of the components of the sensor module 206 during time-of-flight operation (e.g., to calculate a distance of an object 106 from the imaging system 102 and/or to form a two-dimensional or three-dimensional image of the object 106, for example).

In various implementations, as shown in FIGS. 2 and 3, a sensor module 206 is included in an imaging system 102. In an implementation, the sensor module 206 comprises an imaging sensor arranged to receive (e.g., capture) reflected light radiation from one or more objects 106 in the area 108 during a frame event (i.e., during an image capture at a point in time). In one example, the sensor module 206 may be arranged to capture an image (e.g., two-dimensional image or three-dimensional image) of the area 108 or of the object 106 within the area 108 based on receiving the reflection of the light radiation. The sensor module 206 may be arranged to capture the image using time-of-flight principles, for instance.

In another example, the sensor module 206 is arranged to provide phase shift information between the incident light radiation and the reflected light radiation for distance measurement calculations. For instance, in an implementation, the sensor module 206 is arranged to capture one or more phase delay values 410 (shown in FIG. 4) of the light radiation reflected off one or more objects 106 in the area 108 during a frame event 410. The phase delay values 410 represent a phase shift in the reflected light radiation from the incident light radiation, based on a distance traveled, and may be determined (or measured) with respect to one or more reference phase values 408, as described further below.

In an implementation, as shown in FIG. 3, the sensor module 206 is comprised of a plurality of photosensitive pixel devices ("pixels") 302. In one example, each of the multiple pixels 302 may act as an individual image sensor. In such an example, a resulting multi-dimensional image (such as a three-dimensional "distance image," for example) from the sensor module 206 is a combination of the light radiation received at multiple individual pixels 302.

In an implementation, each of the plurality of photosensitive pixels 302 are arranged to capture one or more phase delay values 410 of the light radiation reflected off one or more objects 106 in the area 108. In various implementations, the phase information 410 captured by individual pixels 302 during a frame event 406 may be processed by one or more processing components 402 (e.g., within the control module 208) to determine individual distances from the object(s) 106 in the area 108 to the individual pixels 302. The distances associated with the individual pixels 302 may be combined to form the three-dimensional distance image of the object(s) 106 and/or of the area 108.

When included in an implementation, the control module 208 may be arranged to provide controls and/or processing to the imaging system 102. For example, the control module 208 may control the operation of the imaging system 102, control the operation of one or more of the other modules (202, 204, 206), and/or process the signals and information output by one or more of the other modules (202, 204, 206). In various implementations, the control module 208 is arranged to communicate with one or more of the illumination module 202, modulation component 204, and sensor module 206. In some implementations, the control module 208 may be integrated into one or more of the other modules (202, 204, 206), or be remote to the modules (202, 204, 206).

In one implementation, the control module 208 is arranged to detect, recognize, and/or track an object 106 within the area 108, based on information received from the sensor module 206. In various implementations, the control module 208 may be programmed to recognize some objects 106 and/or gestures and exclude others.

In various implementations, the control module 208 is arranged to calculate a distance from the one or more objects 106 to the sensor module 206, based on one or more phase delay values 410 (e.g., $I_0, I_1, I_2, I_3$) of the light radiation captured by the sensor module 206 during the frame event. The phase delay values 410 are captured at one or more reference phase shifts with respect to the transmitted EM waveform. In one example, the phase delay values 410 are samples of the correlation function, which is the analog output of a pixel 302.

For example, in an implementation, the distance from an object 106 to the sensor module 206 may be estimated based on a phase change of the incident light with respect to the reflected light. The captured phase delay values 410 indicate the distance the light traveled as it was emitted from the illumination module 202, reflected off an object 106, and captured by the sensor module 206 during a frame event.

In one implementation, where the sensor module 206 is comprised of multiple pixels 302, the control module 208 is arranged to calculate distances from the one or more objects 106 within the area 108 to individual pixels 302 of the plurality of pixels 302. In the implementation, the distance calculations are based on one or more phase delay values 410 captured by the individual pixels 302. Each set of phase delay values 410 captured may be used by the control module 208 to estimate a distance from the object(s) 106 to the individual pixel 302 that captured the set.

In some implementations, three, four, or another quantity of phase delay values 410 may be used for each pixel's distance estimation, to improve accuracy of the estimation. Accordingly, the number of distance calculations (per pixel 302) performed for a frame event may be based on the quantity of pixels 302 comprising the sensor module 208 (i.e., the resolution of the sensor module 208) and the quantity of phase delay values 410 captured per pixel 302.

Figure 4:
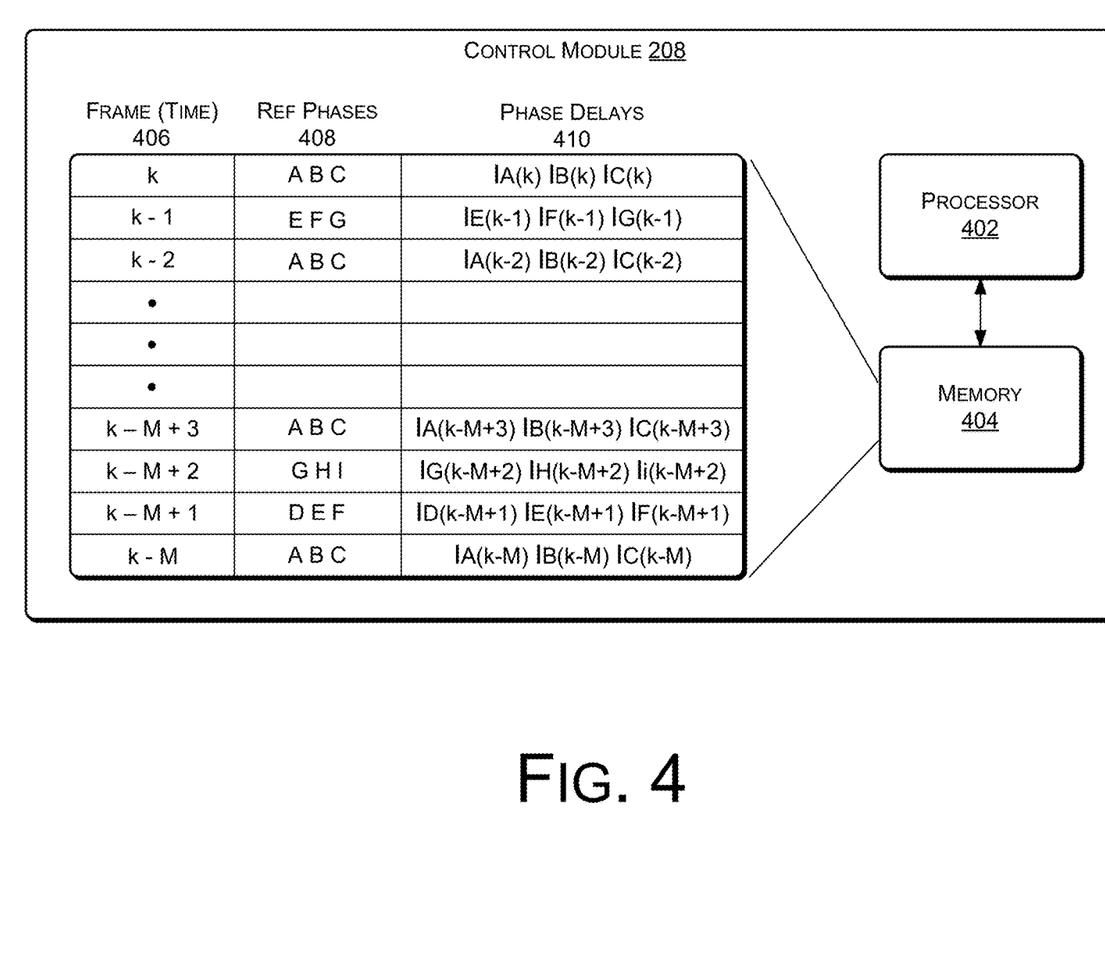
FIG. 4 is a block diagram of an example control module of an imaging system, according to an implementation.

In an implementation, as illustrated in FIG. 4, the phase delay values 410 may correspond to one set of a plurality of sets of reference phases 408. For example, a set of reference phases 408 may include one or more phase angles used as index values with respect to the light radiation, to show a phase shift in the reflected light. In one example, each set of reference phases 408 comprises three or more equally-spaced phase angles (e.g., 0°, 90°, 180°, and 270°) and the phase delay values 410 comprise a corresponding quantity of phase shifts relative to each reference phase angle 408. A corresponding phase shift with respect to its associated reference phase 408 indicates a distance traveled by the light radiation while traversing from the light emitter 202, being reflected off the object 106, and being captured by the image sensor 206.

Example Implementations

Referring to FIG. 4, an example control module 208 is shown, according to an implementation. As shown in FIG. 4, a control module may include at least one or more processing components ("processor") 402 and one or more memory storage devices 404. In various implementations, the processor 402 may comprise a computing device, a controller, logic components, or the like. In the implementations, the processor 402 is arranged to calculate a distance from the one or more objects 106 to the imaging sensor 206 (e.g., sensor module), based on one or more phase delay values 410 of the light radiation captured during a frame event.

In an implementation, the phase delay values 410, as well as other information, may be stored in the memory 404, and accessed by the processor 402. In the implementation, the memory 404 comprises any memory storage device (integrated or separate hardware from the processor 402) capable of storing digital information (electrically, optically, magnetically, etc.) accessible by a processing component, such as the processor 402.

For example, in an implementation, the processing component 402 is arranged to select a set of reference phases 408 from the plurality of sets of reference phases 408 for each frame event 406, according to an algorithm. As shown in FIG. 4, each frame event 406 (from frame k (the present frame) to frame k−M, where M represents the size of memory 404, or number of frame 406 fields) has a corresponding set of reference phases 408 and a set of phase delay values 410. In the implementation, the processor 402 is arranged to select the set of reference phases 408 for the present frame event 406 according to an algorithm, and to select another set of reference phases 408 from the sets of reference phases 408 for each subsequent frame event, according to the algorithm. In an implementation, as shown in FIG. 4, a history of present and past frame events 406, selected sets of reference phases 408 for each frame event 406, and associated phase delay values 410 are stored in the memory 404. In alternate implementations, the memory 404 may include additional or alternate information.

A first example scenario is described with reference to FIG. 4. As shown in the example of FIG. 4, at the previous frame k−2, the set of three reference phases 408 A, B, and C were selected by the processor 402, according to an algorithm. For example, the reference phases 408 A, B, and C may comprise 0°, 120°, and 240°. The resulting phase delay values 410 captured by the sensor module 206 (or an individual pixel 302 of the sensor module 206) to be used in distance estimation include $I_0(k-2)$, $I_{120}(k-2)$, and $I_{240}(k-2)$.

Further, at the previous frame k−1, the set of three reference phases 408 E, F, and G were selected by the processor 402, according to the algorithm. For example, the reference phases 408 E, F, and G may comprise 180°, 300°, and 60°. The resulting phase delay values 410 captured by the sensor module 206 (or an individual pixel 302 of the sensor module 206) to be used in distance estimation include $I_{180}(k-1)$, $I_{300}(k-1)$, and $I_{60}(k-1)$.

Then, at the present frame k, the set of three reference phases 408 A, B, and C were selected again by the processor 402, according to the algorithm. The resulting phase delay values 410 captured by the sensor module 206 (or an individual pixel 302 of the sensor module 206) to be used in distance estimation for the present frame include $I_0(k)$, $I_{120}(k)$, and $I_{240}(k)$.

In this example, the algorithm includes an alternating pattern, where the processor 402 alternately selects between two sets of reference phases 408 (A, B, C and E, F, G). Thus, for a subsequent frame event k+1, the set of three reference phases 408 E, F, and G will be selected again by the processor 402, according to the algorithm. The resulting phase delay values 410 to be captured by the sensor module 206 (or an individual pixel 302 of the sensor module 206) and to be used in distance estimation for the subsequent frame include $I_{180}(k+1)$, $I_{300}(k+1)$, and $I_{60}(k+1)$. In other examples, the alternating sets of reference phases 408 may include fewer or more phase angles (e.g., four phase angles, such as: 45°, 135°, 225°, and 315°, and the like).

In the example just described, the second set of reference phases 408 (E, F, and G) having the values of 180°, 300°, and 60° can be obtained by a signal inversion of the first set of reference phases 408 (A, B, and C) having the values of 0°, 120°, and 240°. In other examples, the phase angles of the reference phases 408 may have other relationships, or no relationship. Further, in an alternate example, the phase angles of the sets of reference phases 408 may not be equally spaced, and may be selected based on desired design criteria.

A second example scenario is illustrated with reference to FIG. 4; using the frame events 406 beginning at frame (k−M) and continuing through frame (k−M+3). In the example, the processor 402 is arranged to select a set of reference phases 408 for a frame event 406 using a different algorithm, that is by rotating through three sets of reference phases 408 (A, B, C), (D, E, F), and (G, H, I). The associated phase delay values 410 for each frame event are shown, based on the selected set of reference phases 408 for each frame event 406.

In other examples, rotating sets of reference phases 408 may include fewer or more phase angles, and/or a greater quantity of sets of reference phases 408 may be rotated through, according to the algorithm used. In further examples, other algorithms may be employed for selection of set(s) of reference phase 408 by the processor 402, having other patterns and/or selection criteria. For example, in an implementation, the processor 402 is arranged to randomly or quasi-randomly select a set of reference phases 408 from a plurality of sets of reference phases 408 for distance estimation. In an implementation, the processor 402 is arranged to select sets of reference phases 408 per pixel 302, according to algorithms selected per pixel 302. In other words, in one implementation, adjacent pixels 302 of the sensor module 206 may use different reference phases, according to algorithms, for a given frame event 406.

In one implementation, the processing component 402 is arranged to calculate distance estimation for a frame event 406 using phase delay values 410 stored for that single frame event 406. Using the example above, the phase shift of a pixel 302 (such as a photon mixing device (PMD) pixel 302, for example) at frame k−1 can be expressed as:

$$x(k-1) = -1 \cdot (I_{300}(k-1) - I_{60}(k-1)) \cdot \sqrt{3},$$

$$y(k-1) = -1 \cdot (2 \cdot I_{180}(k-1) - I_{300}(k-1) - I_{60}(k-1))$$

$$\theta(k-1) = a\tan 2(y(k-1), x(k-1))$$

and for frame k, the phase shift can be expressed as:

$$x(k) = (I_{120}(k) - I_{240}(k)) \cdot \sqrt{3}$$

$$y(k) = 2 \cdot I_0(k) - I_{120}(k) - I_{240}(k)$$

$$\theta(k) = a\tan 2(y(k), x(k))$$

In another implementation, the processing component 402 is arranged to calculate distance estimation for a frame event 406 using joint processing of phase delay values 410 stored for that frame event 406 as well as one or more past frame events 406 to improve accuracy of the distance estimation. In other words, the processing component 402 is arranged to calculate the distance from one or more objects 106 to the imaging sensor 206 (or to a pixel 302 of the imaging sensor 206) based on one or more phase delay values 410 of light radiation captured during a present frame event 406 combined with one or more phase delay values 410 of light radiation captured during one or more past frame events 406.

Again, using the above example, the phase shift of a pixel 302 (such as a PMD pixel 302, for example) at present frame event k, using phase delay values 410 from frame events 406 k and k−1 can be expressed as:

$$\theta(k) = a\tan 2(y(k) + y(k-1), x(k) + x(k-1)).$$

In alternate implementations, the processing component 402 may be arranged to calculate distance estimation for a frame event 406 using phase delay values 410 stored for several frame events 406, while the phase delay 410 information is accessible within the memory 404. For example, the processing component 402 may use the phase delay values 410 of one or more temporally sequential or non-sequential frame events 406, with or without the phase delay values 410 of the present frame event 406, to calculate distance estimation.

In various implementations, the joint processing of one or more previous frame 406 phase delay values 410 with the current frame 406 phase delay values 410 in distance calculations improves the accuracy of the distance estimation. The use of multiple frame events 406 can have a noise averaging effect. Further, better modeling accuracy may be achieved due to more reference phase values 408 used.

In an implementation, the processing component 402 is arranged to adaptively select a quantity of one or more past frame events 406 (and to calculate distances using the associated phase delay values 410) based on whether movement of an object 106 is detected within the area 108 within a preset time duration. For example, in one implementation, the quantity of past frame events 406 is adaptively selected based on the speed of the object 106 movement detected within the area 108 within the preset time duration. In various implementations, the speed of object 106 movement is relative, and may include the speed of the object 106 itself, the speed of the imaging system 102 with respect to the object 106, or a combination of the two.

In one implementation, the processing component 402 is arranged to select fewer past frame events 406 when faster object 106 movement is detected within the area 108 within the preset time duration, and to select more past frame events when slower object 106 movement is detected within the area 108 within the preset time duration. For example, the processing component 402 may be arranged to dynamically make new quantity selections for successive frame events 406 (e.g., for each new "present" frame) during runtime. In an alternate implementation, more past frame events 406 may be selected when faster object 106 movement is detected and fewer frame events 406 may be selected when slower object 106 movement is detected.

In an implementation, one or more relative speed thresholds may be preselected for determining a quantity of frame events 406 to be selected as the relative speed reaches the thresholds. For example, in one example where the relative speed of the object 106 with respect to the imaging system 102 reaches a maximum threshold, a single frame event 406 may be selected, and the associated phase delay values 410 may be used for distance calculations. In another example where the relative speed of the object 106 with respect to the imaging system 102 reaches a minimum threshold (i.e., little or no relative movement, for example), a predefined maximum quantity of frame events 406 may be selected, and the associated phase delay values 410 used for distance calculations. An additional quantity of thresholds may be preselected to trigger other progressive quantities of frame events 406 between the two extremes. Alternately, the preselected thresholds may trigger the quantity of frame events 406 to be selected in a reverse manner, as mentioned above.

In various implementations, the quantity of frame events 406 selected based on the detection and the speed of object 106 movement is performed on a pixel-by-pixel 302 basis. For example, an object 106 may be moving in one portion of the area 108 corresponding to one or more pixels 302, and the remaining portions of the area 108 may be free from object 106 movement. In such a case, selection of frame events 406 to be used to calculate distances may be performed per pixel 302 for improved efficiency.

Additionally, when no object 106 movement is detected in a portion of the area 108 over a predetermined time frame, the imaging system 102 may refrain from making new distance calculations with respect to the pixels 302 associated with the portion of the area 108, and may instead reuse previous distance calculations from earlier frame events 406 at the pixels 302. In this way, the imaging system 102 can improve processor 402 and pixel 302 signaling efficiency by reducing redundant calculations.

In an implementation, the control module 206 is arranged to adaptively select a quantity of one or more past frame events 406 during runtime, based on minimizing the occurrence of motion artifacts. For example, in some cases, motion artifacts can appear while joint processing over multiple frames, particularly when the scene is rapidly changing (e.g., when objects 106 within the area 108 are moving rapidly with respect to the imaging system 102). In the implementation, the adaptive selection of past frame events 406 by the processing component 402 can mitigate the occurrence of motion artifacts. As mentioned above, the adaptive selection may be performed based on a "speed of change" criterion (e.g., the speed of object 106 movement with respect to the imaging system 102).

In an implementation, the processing component 402 is arranged to detect object 106 movement within the area 108 based on an analysis of the temporal evolution (e.g., from frame 406 to frame 406) of one or more phase delay values 410 of light radiation captured during a present frame event 406 and during one or more past frame events 406. For example, the processing component 402 may analyze a sequence of phase shifts of the phase delay values 410 over a series of frame events (e.g., over a time duration) for one or more pixels 302 to detect object 106 movement within the area 108. The sequence of phase shifts of the phase delay values 410 (or functions thereof) can indicate object 106 movement by showing changing phase shifts relative to a pixel 302, for example.

In various implementations, one or more detection algorithms may be used to detect object 106 movement within the area 108. Determination of object 106 movement thresholds may be based on what is considered to be a significant change of distance for a particular application. For example, in one implementation, a significant distance change may be defined as on the order of several centimeters. In other examples, a significant distance change may be much greater or much smaller.

Referring back to the example expression for a phase shift of a pixel 302, using phase delay values 410 from frame events 406 k and k−1:

$$\theta(k) = a\tan 2(y(k)+y(k-1), x(k)+x(k-1))$$

the input values of the a tan 2 function may be used to detect changing distances between the imaging system 102 and an object 106 in the area 108. In an example, the analysis is performed before the main processing function of the expression above.

In a first example detection algorithm, less computational effort is used. The distance between an object 106 and a pixel 302 has changed if the absolute value of x(k)−x(k−1) or y(k)−y(k−1) is larger than one or more predefined movement thresholds. Example computations for the first example detection algorithm include $$d_x(k) = |x(k) - x(k-1)|$$

$$d_y(k) = |y(k) - y(k-1)|$$

In an example, the first detection algorithm may be used if $d_x(k) > \delta_x$ or $d_y(k) > \delta_y$, otherwise, the second example detection algorithm (shown below) is used. In one implementation, the thresholds $\delta_x$ and $\delta_y$ are dependent on an expected noise level in x and y.

In the second example detection algorithm, more computational effort may be used than with the first example detection algorithm, but better accuracy may be achieved. The second example detection algorithm is based on a first order Taylor Series approximation of the a tan 2( ) function in the vicinity of the input values at frame event 406 (e.g., time index) k−1 (i.e., x(k−1) and y(k−1)), according to:

$$\operatorname{atan2}(y(k), x(k)) \approx \operatorname{atan2}(y(k-1), x(k-1)) + \frac{x(k-1) \cdot y(k) - y(k-1) \cdot x(k)}{(x(k-1))^2 + (y(k-1))^2}$$

In the example, the present phase shift at frame event 406 k is expressed as the previous phase shift at frame event 406 k−1, plus an update term. In other words, the update term is a measure of the phase change (and distance change) from time k−1 to time k. In an implementation, the second example detection algorithm can be accurate for very small phase changes.

In an example, the second example detection algorithm may be used if $$\left| \frac{x(k-1) \cdot y(k) - y(k-1) \cdot x(k)}{(x(k-1))^2 + (y(k-1))^2} \right| > \delta,$$

otherwise, the first example detection algorithm (shown above) is used. In one implementation, the division by $(x(k-1))+(y(k-1))^2$ of the second example detection algorithm may be omitted, to increase processing efficiency if desired.

In an alternate implementation, the first example detection algorithm and the second example detection algorithm may be applied jointly.

Figure 5:
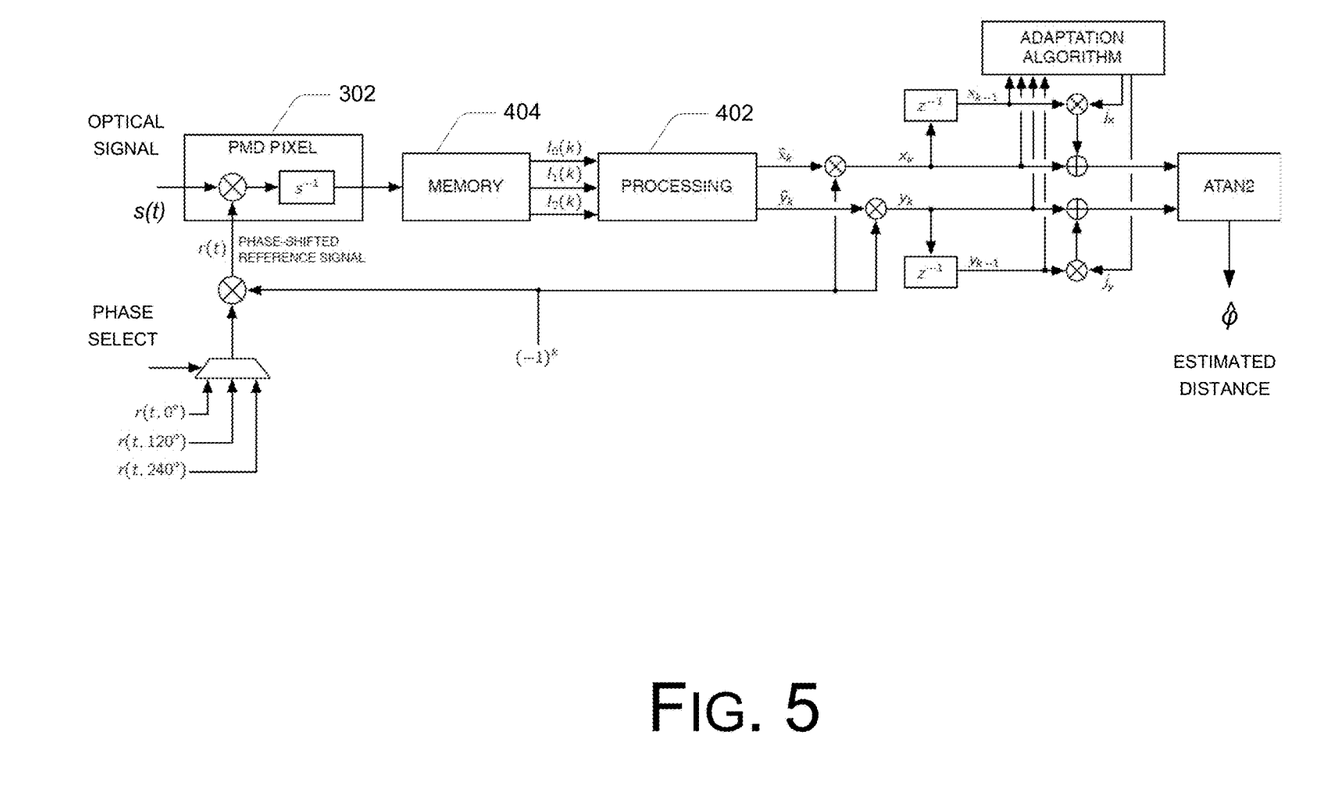
FIG. 5 illustrates an example adaptive algorithm concept, according to an implementation.

FIG. 5 illustrates an example adaptive algorithm concept, according to an implementation, showing an example implementation of the techniques and devices discussed above. As shown in FIG. 5, a set of three reference phases 408 (at 0°, 120°, and) 240° may be used to determine phase delay values 410 for every-other frame event 406 (even frames 406, for example). The other alternating frame events 406 (odd frames 406, for example) are indexed by inverting the set of reference phases 408 (shifting by 180°, as discussed above, e.g., 180°, 300°, 60°).

The captured phase delay values 410 (by the pixel 302) from the reflected optical signal s(t), based on the reference phase values 408, are stored in the memory 404 for each frame event 406. The processing component 402 retrieves the phase delay values 410 for the current frame event 406 k, and processes them to calculate phase shift indeces according to the following expressions:

$$\tilde{x}_k := \sqrt{3}(I_1(k) - I_2(k))$$

$$\tilde{y}_k := 2I_0(k) - I_1(k) - I_2(k)$$

The phase shifts from the present frame event 406 may be jointly processed with the phase delay values 410/phase shifts from one or more previous frame events 406 to determine a distance estimation $\hat{\varphi}$, according to the a tan 2 expression discussed above. In an example, as shown in FIG. 5, the frame event 406 history is disabled, and the current frame event 406 alone is used for distance calculation when $j_x = j_y = 0$. Alternately, the frame event 406 history is enabled when $j_x = j_y = 1$, and the current frame event 406 is jointly processed with one or more previous frame events 406 to calculate the distance estimation.

In various implementations, the control module 208 may also be arranged to calculate a distance of the object 106 from the imaging system 102, based on the measured time of the reflected EM radiation. Accordingly, the control module 208 may be arranged to convert the current signal output from the sensor module 206 (or from the pixels of the sensor module 206) to a distance of the object 106 from the imaging system 102. Further, in an implementation, the control module 208 may be arranged to convert the current signal to a three-dimensional image of the object 106.

In one implementation, the control module 208 is arranged to output the calculated distance and/or the three-dimensional image of the object 106. For example, the imaging system 102 may be arranged to output a distance, a three-dimensional image of the detected object 106, tracking coordinates of the object 106, and so forth, to a display device, to another system arranged to process the information, or the like.

In various implementations, additional or alternative components may be used to accomplish the disclosed techniques and arrangements.

Representative Process

Figure 6:
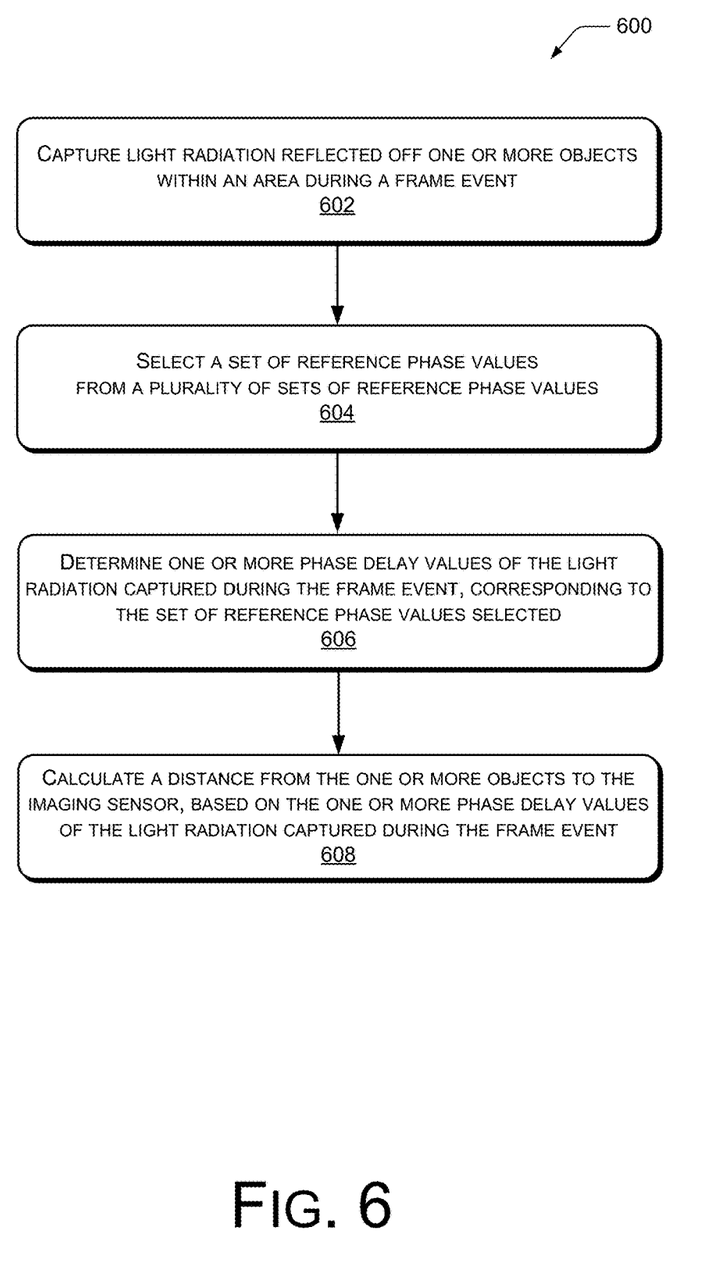
FIG. 6 is a flow diagram illustrating an example process of adaptively estimating distances by an imaging system, according to an implementation.

FIG. 6 illustrates a representative process 600 for adaptively estimating distances of objects (such as objects 106, for example) from an imaging system (such as imaging system 102). The process 600 describes capturing one or more phase delay values (such as phase delay values 410, for example) from reflected light radiation. One or more sets of reference phases may be alternated or rotated with subsequent frame events to determine the phase delay values. The process 600 is described with reference to FIGS. 1-5.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

In one example, the EM radiation may be emitted by an emitter (such as illumination module 202, or the like) comprising an LED or laser emitter, for example. In some implementations, the EM radiation may be modulated light. For example, the light may be modulated using a modulation component (such as modulation component 204) and may be modulated in correlation to the modulation of one or more photosensitive pixels of the imaging device.

At block 602, the process includes capturing light radiation reflected off one or more objects (such as object 106, for example) in an area (such as area 108, for example) during a frame event (i.e., an image capture at a point in time), with an imaging sensor (such as sensor module 206 and/or pixel 302, for example). The imaging sensor may be comprised of one or more photosensitive pixels (such as pixels 302), for example. The EM reflection may be received by the imaging sensor via optics, a receiver, an antenna, or the like, for instance.

At block 604, the process includes selecting a set of reference phase values (such as reference phase values 408, for example) from a plurality of sets of reference phase values, according to an algorithm. The process further includes selecting a subsequent set of reference phase values from the plurality of sets of reference phase values for each subsequent frame event according to the algorithm. In an example, the reference phase values change for each subsequent frame event from the previous frame event. In some implementations, the reference phase values alternate, rotate, and the like, among a quantity of sets of reference phases.

At block 606, the process includes determining one or more phase delay values (such as phase delay values 410, for example) of light radiation captured during the current frame event, corresponding to the set of reference phase values selected.

At block 608, the process includes calculating a distance from the one or more objects to the imaging sensor, based on the one or more phase delay values of the light radiation captured during the current frame event. In an implementation, the process includes calculating the distance from the one or more objects to the imaging sensor based on one or more phase delay values of light radiation captured during a present frame event combined with one or more phase delay values of light radiation captured during one or more past frame events.

In an implementation, the process includes calculating a distance from the one or more objects to a pixel of the imaging sensor. The process further includes adaptively selecting a quantity of frame events for the distance calculation relative to the pixel during runtime (e.g., per pixel selection). For example, the selection may be based on detecting a threshold object movement within a portion of the area corresponding to the pixel.

In an implementation, the process includes adaptively selecting the quantity of frame events for the distance calculation based on a speed of object movement detected. For example, the process includes increasing a quantity of frame events selected when the speed of object movement decreases and decreasing a quantity of frame events selected when the speed of object movement increases. In an alternate implementation, the process may include decreasing a quantity of frame events selected when the speed of object movement decreases and increasing a quantity of frame events selected when the speed of object movement increases, based on the application of the imaging device.

In an implementation, the past frame events selected for the distance calculation are a sequential set of frame events (e.g., a sequence of time). In various implementations, the frame events selected for the distance calculation relative to the pixel are temporally non-sequential. For example, the frame events selected may conform to another pattern that is non-sequential or they may be random or quasi-random.

In an implementation, the process includes reusing a distance calculation from one or more objects to a pixel when no threshold object movement is detected relative to the pixel, within a preselected time duration. For example, instead of recalculating a distance from the pixel to an object when there is no relative movement of the object, previous distance calculations may be reused for the object. This may increase processor efficiency when only a portion of a scene is changing (e.g., an object at one portion of the area corresponding to one or more pixels is moving, but the remainder of the area is static).

In an implementation, the process includes mitigating an occurrence of motion artifacts and/or averaging imaging noise by adaptively selecting a quantity of past frame events for the distance calculation, based on a speed of object movement detected within the area.

In another implementation, the process includes analyzing a temporal sequence of phase shifts of the phase delay values over a series of frame events to detect object movement within the area. In the implementation, a threshold change in a phase delay value or a phase shift relative to a pixel of the imaging sensor indicates a change in a distance of the object within a portion of the area corresponding to the pixel.

In one implementation, the process includes defining a phase shift of a phase delay value at a present frame event as a former phase shift of a previous frame event plus an update term. For example, to calculate the distance from the one or more objects to the imaging sensor, the update term indicates a change in distance of the one or more objects from a time of the previous frame event to a time of the present frame event.

In an implementation, the process further includes time-of-flight techniques such as measuring a time from emitting the EM radiation to receiving the reflection of the EM radiation and calculating a distance of an object based on the measured time. In various implementations, the process includes outputting image or gesture information to a computing device for input control, or the like. Additionally, the process may include outputting imaging information, such as a distance, a three-dimensional image of the detected object, tracking coordinates of the object, and so forth, to a display device, to another system arranged to process the information, or the like.

In alternate implementations, other techniques may be included in the process in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An apparatus, comprising:
   an imaging sensor to capture light radiation reflected off of one or more objects in an area during a frame and a subsequent frame; and
   a processing component configured to:
      select a first set of reference phases used to index phase shifts in the light radiation captured during the frame;
      select a second set of reference phases used to index phase shifts in the light radiation captured during the subsequent frame,
         the first set of reference phases being different than the second set of reference phases;
      calculate a first distance from the one or more objects to the imaging sensor based on one or more phase delay values of the light radiation captured during the frame,
         the one or more phase delay values corresponding to the first set of reference phases, and
      calculate a second distance from the one or more objects to the imaging sensor using the second set of reference phases during the subsequent frame.

2. The apparatus of claim 1, where the processing component, when selecting the first set of reference phases, is configured to:
   select the first set of reference phases according to an algorithm.

3. The apparatus of claim 1, where the processing component, when calculating the first distance, is configured to:
   calculate the first distance based on one or more phase delay values associated with a past frame.

4. The apparatus of claim 1, where the processing component, when calculating the first distance, is configured to:
   calculate the first distance based on the one or more phase delay values and sets of phase delay values associated with a plurality of past frames.

5. The apparatus of claim 4, where the processing component is configured to:
   adaptively select a quantity of the plurality of past frames based on whether object movement is detected within the area within a preset time duration.

6. The apparatus of claim 5, where the quantity of the plurality of past frames is adaptively selected based on a speed of the object movement,
   a first quantity of the plurality of past frames being selected when the speed of the object movement satisfies a threshold, or
   a second quantity of the plurality of past frames being selected when the speed of the object movement does not satisfy the threshold,
      the first quantity being different from the second quantity.

7. The apparatus of claim 5, where the processing component is configured to:
   detect the object movement based on an analysis of a temporal evolution of the one or more phase delay values in relation to the sets of phase delay values associated with the plurality of past frames.

8. The apparatus of claim 1, where the imaging sensor is comprised of multiple pixel devices, and
   where the processing component is configured to calculate multiple distances from the one or more objects,
      each distance, of the multiple distances, corresponding to a pixel device of the multiple pixel devices.

9. The apparatus of claim 1, where the first set of reference phases comprises 0 degrees, 120 degrees, and 240 degrees, and the second set of reference phases comprises 180 degrees, 300 degrees, and 60 degrees.

10. The apparatus of claim 1, where the imaging sensor is configured to capture a three-dimensional image of the area using time-of-flight principles during the frame.

11. A system, comprising:
    an illumination module to emit light radiation to illuminate an area;
    a sensor module, comprising a plurality of pixels, to capture one or more phase delay values of the light radiation after reflection off of one or more objects in the area during a frame and a subsequent frame,
       the one or more phase delay values corresponding to alternating sets of reference phases; and
    a control module configured to:
       select a first set of reference phases, of the alternating sets of reference phases, used to index phase shifts in the light radiation captured during the frame;
       select a second set of reference phases, of the alternating sets of reference phases, used to index phase shifts in the light radiation captured during the subsequent frame,
          the first set of reference phases being different than the second set of reference phases;
       calculate a first distance between the one or more objects and a pixel, of the plurality of pixels, based on a first set of phase delay values, corresponding to the first set of reference phases associated with the frame; and
       calculate a second distance between the one or more objects and the pixel using the second set of reference phases during the subsequent frame.

12. The system of claim 11, where the control module is further configured to:
    select the second set of reference phases according to an algorithm.

13. The system of claim 11, where the control module, when calculating the first distance, is configured to:
    calculate the first distance based on the first set of phase delay values and one or more phase delay values associated with one or more past frames,
       where the control module is to adaptively select a quantity of the one or more past frames based on a speed of object movement indicated with respect to the pixel or based on minimizing an occurrence of motion artifacts.

14. The system of claim 11, where each set of reference phases, of the alternating sets of reference phases, comprises three or more equally-spaced phase angles, and each set of reference phases comprises a corresponding quantity of phase delay values.

15. A method, comprising:
capturing, by an imaging sensor, light radiation reflected off of one or more objects within an area during a frame and a subsequent frame;
selecting, by a processing component, a first set of reference phases used to index phase shifts in the light radiation captured during the frame;
selecting, by the processing component, a second set of reference phases used to index phase shifts in the light radiation captured during the subsequent frame,
the first set of reference phases being different than the second set of reference phases;
calculating, by the processing component, a first distance, from the one or more objects to the imaging sensor, based on one or more phase delay values of the light radiation captured during the frame, and
the one or more phase delay values corresponding to the first set of reference phases, and
calculating, by the processing component, a second distance from the one or more objects to the imaging sensor using the second set of reference phases during the subsequent frame.

16. The method of claim 15,
where the method further comprises:
selecting the second set of reference phases, according to an algorithm.

17. The method of claim 15, where calculating the first distance comprises:
calculating the first distance further based on one or more phase delay values associated with one or more past frames.

18. The method of claim 15, where the first distance corresponds to a pixel of the imaging sensor, and
where the method further comprises:
adaptively selecting a quantity of frames for calculating the first distance when a threshold object movement, within a portion of the area corresponding to the pixel, is detected; or
reusing the first distance when no threshold object movement is detected within the portion of the area corresponding to the pixel.

19. The method of claim 18, where adaptively selecting a quantity of frames comprises:
adaptively selecting the quantity of frames based on a speed of the threshold object movement detected, including increasing the quantity of frames selected when the speed of the threshold object movement decreases or decreasing the quantity of frames selected when the speed of the threshold object movement increases.

20. The method of claim 18, where frames corresponding to the quantity of frames are temporally non-sequential.

21. The method of claim 15, further comprising:
mitigating an occurrence of motion artifacts or averaging imaging noise by adaptively selecting a quantity of past frames for calculating the first distance,
the quantity of past frames being selected based on a speed of object movement detected within the area.

22. The method of claim 15, further comprising:
analyzing a temporal sequence of phase shifts of the phase delay values over a series of frames, including the frame, to detect object movement within the area,
where a threshold change in a phase delay value, of the one or more phase delay values, indicates a change in a distance.

23. The method of claim 15, further comprising:
defining a phase shift of a phase delay value at the frame as a former phase shift of a previous frame plus an update term in order to calculate the first distance from the one or more objects to the imaging sensor,
where the update term indicates a change in the first distance from a time of the previous frame to a time of the frame.

24. A three-dimensional imaging device, comprising:
an imaging sensor to capture a three-dimensional image of an area based on time-of-flight principles,
the imaging sensor comprising:
a plurality of pixels arranged to capture light radiation reflected off of an object in the area during a frame and a subsequent frame; and
a processing component configured to:
select a first set of reference phases used to index phase shifts in the light radiation captured during the frame;
select a second set of reference phases used to index phase shifts in the light radiation captured during the subsequent frame,
the first set of reference phases being different than the second set of reference phases;
calculate a first distance from the object to the imaging sensor based on one or more phase delay values of the light radiation captured during the frame,
the one or more phase delay values corresponding to the first set of reference phases; and
calculate a second distance from the object to the imaging sensor using the second set of reference phases during the subsequent frame.

* * * * *